US009129260B2

(12) United States Patent
Neary et al.

(10) Patent No.: US 9,129,260 B2
(45) Date of Patent: Sep. 8, 2015

(54) METHODS AND APPARATUS FOR SUBMITTING AND REVIEWING AUDITIONS

(76) Inventors: Donald Kent Neary, Blowing Rock, NC (US); Akash Kava, Pushpa Park (IN)

( * ) Notice: Subject to any disclaimer, the term of this patent is extended or adjusted under 35 U.S.C. 154(b) by 694 days.

(21) Appl. No.: 12/896,959

(22) Filed: Oct. 4, 2010

(65) Prior Publication Data
US 2012/0084398 A1    Apr. 5, 2012

(51) Int. Cl.
| | |
|---|---|
| G06F 15/16 | (2006.01) |
| G06Q 10/10 | (2012.01) |
| G06Q 30/06 | (2012.01) |
| G06Q 30/08 | (2012.01) |

(52) U.S. Cl.
CPC ........ *G06Q 10/1053* (2013.01); *G06Q 30/0605* (2013.01); *G06Q 30/0611* (2013.01); *G06Q 30/08* (2013.01)

(58) Field of Classification Search
CPC .......... G06Q 30/0611; G06Q 10/1053; G06Q 30/08; G06Q 30/0605
See application file for complete search history.

(56) References Cited

U.S. PATENT DOCUMENTS

| | | | | |
|---|---|---|---|---|
| 5,227,863 | A * | 7/1993 | Bilbrey et al. | 348/578 |
| 5,822,529 | A * | 10/1998 | Kawai | 709/219 |
| 7,325,043 | B1 * | 1/2008 | Rosenberg et al. | 709/219 |
| 7,428,704 | B2 * | 9/2008 | Baker et al. | 715/730 |
| 7,529,712 | B2 * | 5/2009 | Heaven et al. | 705/51 |
| 8,667,160 | B1 * | 3/2014 | Haot et al. | 709/231 |
| 2001/0042249 | A1 * | 11/2001 | Knepper et al. | 725/42 |
| 2002/0103876 | A1 * | 8/2002 | Chatani et al. | 709/217 |
| 2002/0128891 | A1 * | 9/2002 | McSherry | 705/8 |
| 2002/0133369 | A1 * | 9/2002 | Johnson | 705/1 |
| 2002/0198723 | A1 * | 12/2002 | Mowry | 705/1 |
| 2003/0050062 | A1 * | 3/2003 | Chen et al. | 455/435 |
| 2003/0122922 | A1 * | 7/2003 | Saffer et al. | 348/14.01 |
| 2003/0153993 | A1 * | 8/2003 | Okamoto | 700/94 |
| 2004/0098743 | A1 * | 5/2004 | Gutta et al. | 725/46 |
| 2004/0128624 | A1 * | 7/2004 | Arellano et al. | 715/530 |
| 2004/0153472 | A1 * | 8/2004 | Rieffanaugh, Jr. | 707/104.1 |
| 2005/0132305 | A1 * | 6/2005 | Guichard et al. | 715/855 |
| 2005/0264648 | A1 * | 12/2005 | Ivashin et al. | 348/14.09 |

(Continued)

OTHER PUBLICATIONS

Unknown author; liveMansion.com; 2007; Ckrush; 5 webpage documents.*

(Continued)

*Primary Examiner* — Krista Zele
*Assistant Examiner* — Anthony Fabbri
(74) *Attorney, Agent, or Firm* — Ruben Alcoba, Esq.

(57) ABSTRACT

Auditions need no longer be held locally within the casting director's office. Talent registration forms, size cards, talent worksheets and the duplication of numerous DV tapes or DVDs are no longer necessary, thus resulting in the saving of time, money and energy. Auditions may be conducted collectively by talent agents or individually by talent who use their computer or mobile devices to film their individual audition and submit it via the internet using proprietary software from anywhere in the world. Auditions are saved digitally on a storage server and transmitted over the internet, saving on both duplicating and courier transfer costs. Audition corrections, if required, can be communicated to talent that have already submitted their auditions, and they can resubmit their corrections using the internet from wherever they are. Clients will have the ability to review and download individual video tracks, headshots, enlarged profile images, resumes, size cards and talent logs, as well as open and view the talent's multi-media profile.

6 Claims, 4 Drawing Sheets

(56) References Cited

U.S. PATENT DOCUMENTS

| | | | |
|---|---|---|---|
| 2006/0047698 A1* | 3/2006 | Fox | 707/103 X |
| 2006/0173785 A1* | 8/2006 | Behbehani | 705/54 |
| 2007/0183741 A1* | 8/2007 | Lerman et al. | 386/54 |
| 2007/0204008 A1* | 8/2007 | Sindoni | 709/217 |
| 2007/0239513 A1* | 10/2007 | Vlanjic et al. | 705/9 |
| 2007/0265865 A1* | 11/2007 | Cox et al. | 705/1 |
| 2007/0294092 A1* | 12/2007 | Calannio | 705/1 |
| 2008/0010372 A1* | 1/2008 | Khedouri et al. | 709/224 |
| 2008/0040141 A1* | 2/2008 | Torrenegra et al. | 705/1 |
| 2009/0150215 A1* | 6/2009 | Kalb et al. | 705/10 |
| 2009/0265278 A1* | 10/2009 | Wang et al. | 705/54 |

OTHER PUBLICATIONS

Unknown author; LiveMansion Video Player Launches; Oct. 17, 2006; Business Wire; 2 pages.*

Unknown author;IFILM to Host Exclusive sneak Peel of "Livemansion: The Movie" ;Mar. 22, 2007; Market Wire L.P.;4 pages.*

* cited by examiner

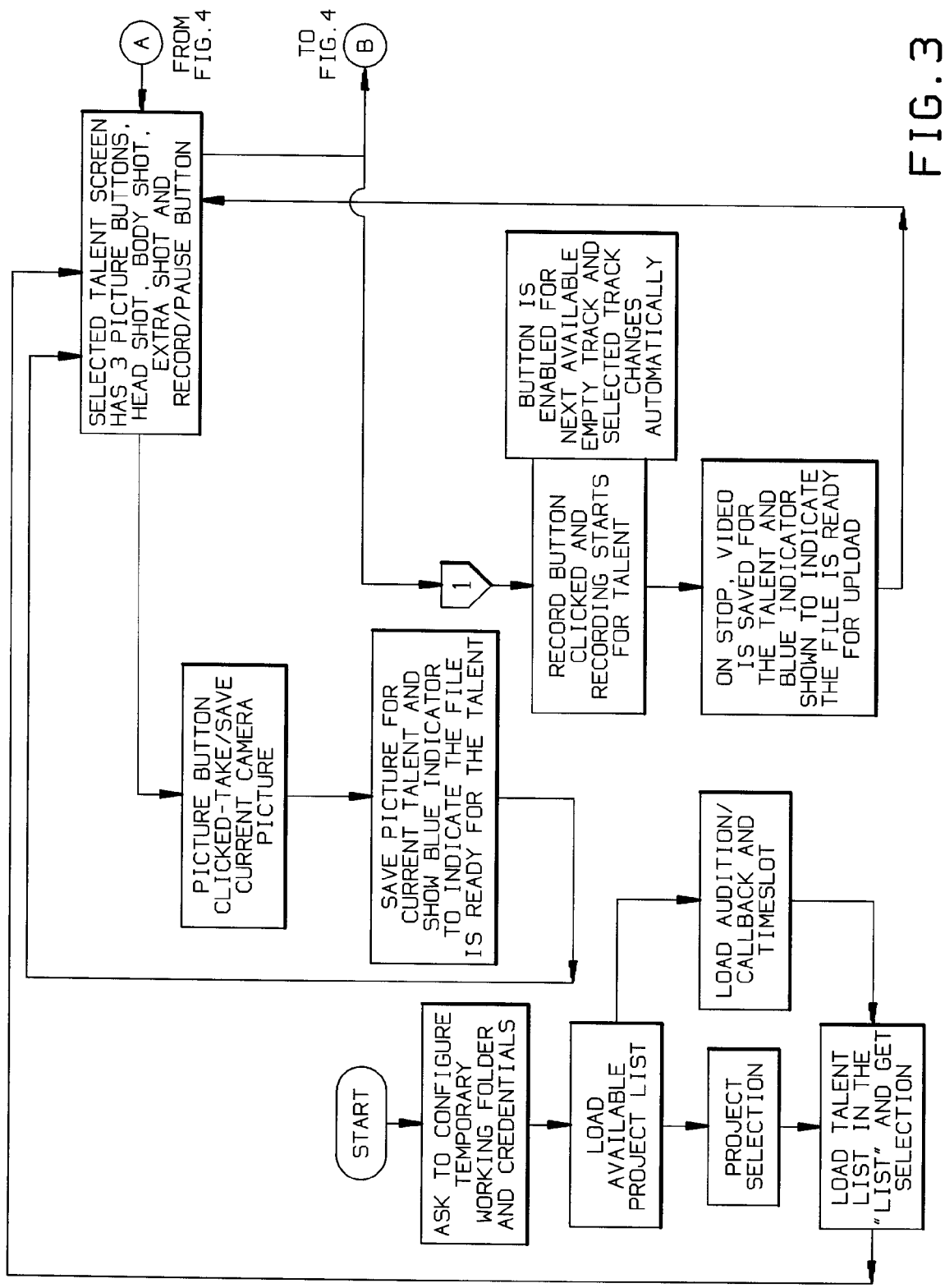

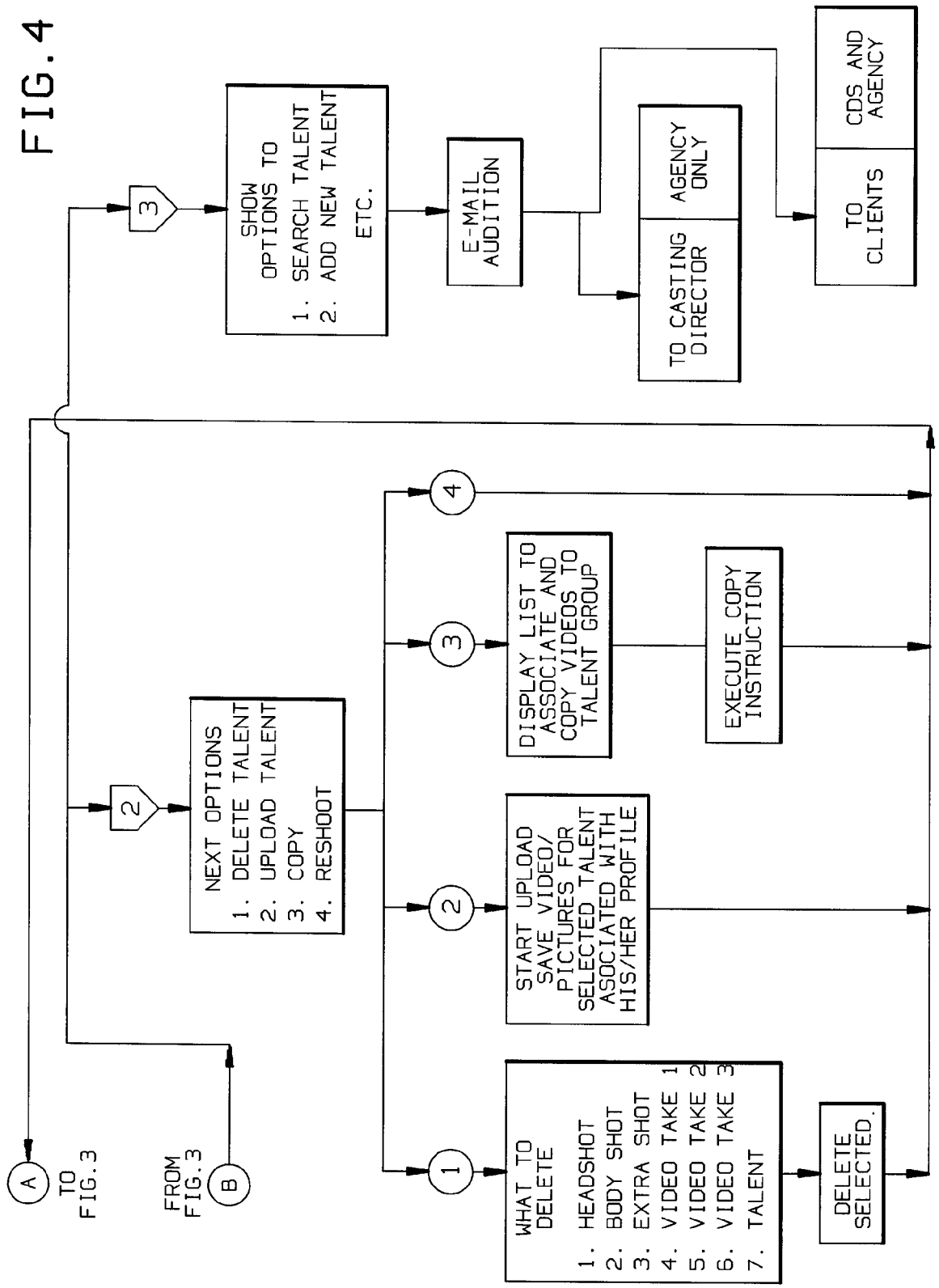

METHODS AND APPARATUS FOR SUBMITTING AND REVIEWING AUDITIONS

BACKGROUND OF THE INVENTION

The present invention relates to auditioning talent for film, stage, television, and the like, and, more particularly, to methods and apparatus for submitting and reviewing auditions remotely through a personal computer, digital camera, video and still camera, camera phone, smart phone, and the like through the internet or any remote communication media.

The casting process for auditioning talent for film, stage and television requires that the talent travel to a particular location, complete registration forms, a size card and a talent worksheet. Following registration, the talent is auditioned on DV tapes or DVDs. At the completion of the audition, the casting director must duplicate these tapes/DVDs in real time, providing one copy for each client, then courier the original and duplicate tapes/DVDs, size cards and talent worksheets to the various client locations, as specified by the work order. The following day, individual clients review the various tapes/DVDs, size cards and talent worksheets in an effort to choose their "selects". The tape/DVD process selection process is encumbered by difficulties resulting from navigating back and forth in an effort to make talent comparisons and choose their "selects".

As of today, auditions can only be held at a physical location, and can only be shot using traditional video cameras which may or may not be synchronized with a computer. To have talent travel to particular locations for auditions can be expensive. In addition, there is wasted time and expense by requiring duplication of tapes/DVDs and delivery of these media to the client for review. There is no dynamic link between the breakdown, auditioning talent profile, and the audition tape. Cross-referencing needs to be tracked manually. Also, awarding of the role requires manual intervention and is not dynamically synchronized through the system. Current systems do not allow talent to audition themselves and submit their auditions into breakdown projects.

As can be seen, there is a need for methods and apparatus to allow talent to audition themselves, submit their auditions and track the status of their auditions.

SUMMARY OF THE INVENTION

In one aspect of the present invention, an application providing a mechanism for talent to audition for a role comprises program code adapted to receive roles for which the talent is eligible to apply; program code adapted to allow the talent to take, select and save media elements requested for the role; program code adapted to upload the saved media elements to a server.

In another aspect of the present invention, an application for managing the acquisition of talent for roles comprises a module adapted to obtain an audition from talent and save the audition onto a server; a module adapted to provide an agent the ability to review, edit and remove auditions of the talent from the server prior to submission to a casting director; a module adapted to provide the ability for the casting director to display and select auditions from the server and flag selected auditions for particular roles.

These and other features, aspects and advantages of the present invention will become better understood with reference to the following drawings, description and claims.

BRIEF DESCRIPTION OF THE DRAWINGS

FIG. 3 is a flow chart describing an auditioning process for computer applications, according to an exemplary embodiment of the present invention; and FIG. 4 is a continuation of the flow chart of FIG. 3.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, an embodiment of the present invention provides methods and apparatus for auditioning talent for film, stage, television and the like. Auditions need no longer be held locally within the casting director's office. Talent registration forms, size cards, talent worksheets and the duplication of numerous DV tapes or DVDs are no longer necessary, thus resulting in the saving of time, money and energy. At the discretion of the casting director, auditions may be conducted collectively by talent agents or individually by talent who use their computer with inbuilt or attached camera and microphone or mobile devices to film their individual audition and submit it via the internet (or other wireless means, such as 3G, 4G and the like) using proprietary software from anywhere in the world. Auditions are saved digitally on a storage server and transmitted over the internet, saving on both duplicating and courier transfer costs. Audition corrections, if required, can be communicated to talent that have already submitted their auditions, and they can resubmit their corrections using the internet from wherever they are, and need not travel back to the location of the audition. Clients will have the ability to review and download individual video tracks, headshots, enlarged profile images, resumes, size cards and talent logs, as well as open and view the talent's multi-media profile.

As used herein, the term "casting director" refers to a person, organization or entity that generates a breakdown or project. The term "breakdown" is a description of a production, generated by the casting director, which lists and describes the various roles. Auditions of talent are required for these breakdowns. The term "agency" or "agents" refers to an organization, person or entity that has a database of talent. The term "talent" refers to an individual who is desirous of being submitted for auditions in order to obtain a job for roles of breakdowns. Talent form the database of the talent agencies or agents.

Figure 1:
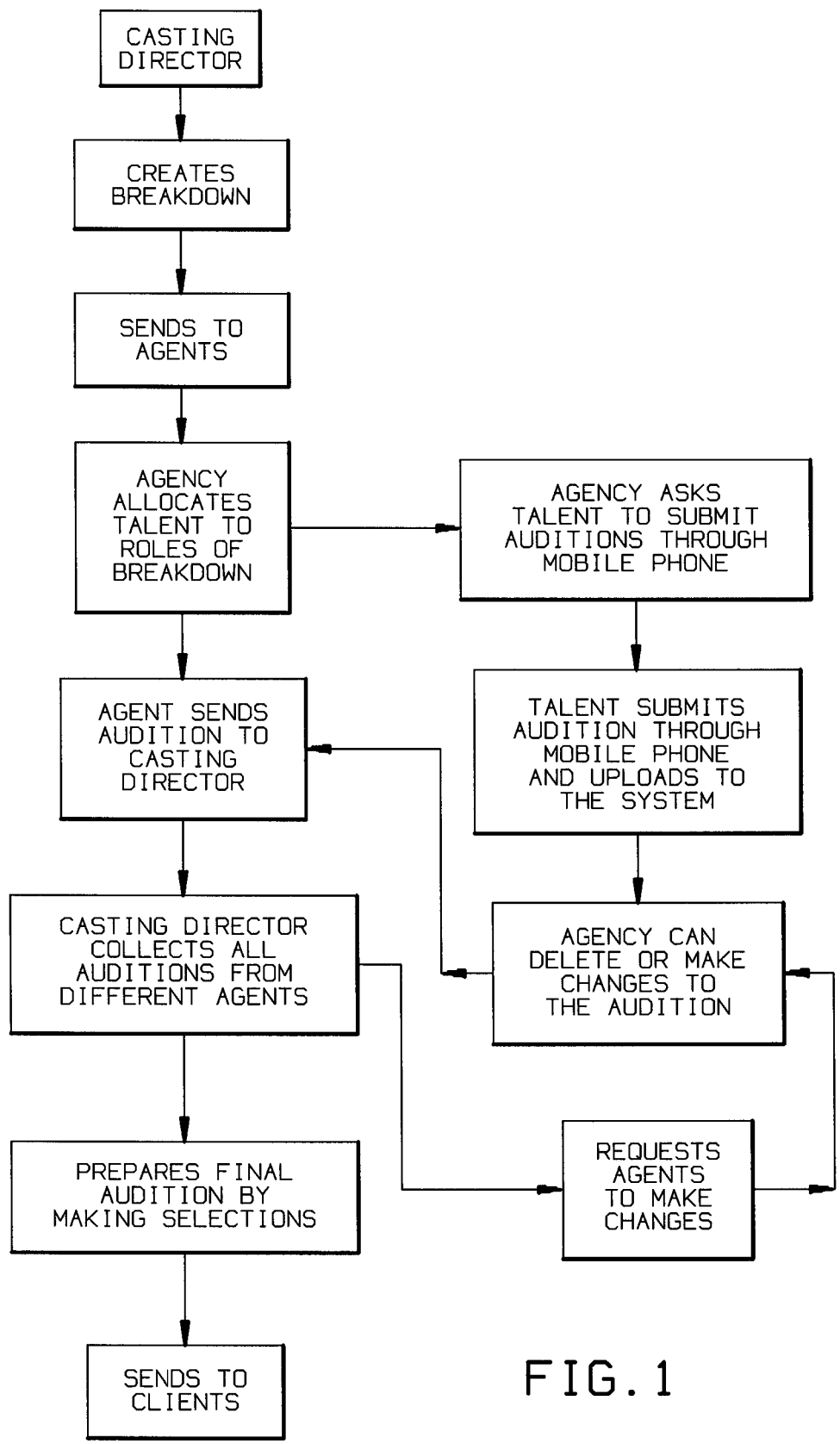
FIG. 1 is a flow chart providing an overview of a method for auditioning talent according to an exemplary embodiment of the present invention.

Referring to FIG. 1, a flow chart describes an overview of a method for auditioning talent according to an exemplary embodiment of the present invention. A computer application may carry out some or all of the steps described herein. The computer application may be available on various computer platforms (such as PC-based and Mac-based) and for mobile phones (including smart phones, such as the i-Phone®).

The casting director may create a breakdown and send this breakdown to agents. Alternatively, the casting director may send particular roles directly to talent. This alternate embodiment may be useful if, for example, the casting director desires a particular individual for a particular role. If the talent is represented by a particular agency, the casting director may send the breakdown to that particular agency, with a flag on certain roles with the requested talent for those roles.

The agency receiving the breakdown from the casting director may allocate talent to roles of the breakdown. The agency may invite local talent into their office to take their audition. Alternatively, the agency may ask talent to submit their auditions through their mobile phone or through a computer application maintained by the talent. After submission of the audition, the audition is uploaded to a database system. The agency can make deletions and/or changes to each audition before sending the auditions to the casting director.

The casting director may collect auditions from all of the agencies or individual talent and either request changes from the agency or prepare final auditions by making selections. These final auditions may be sent to the client for approval.

Figure 2:
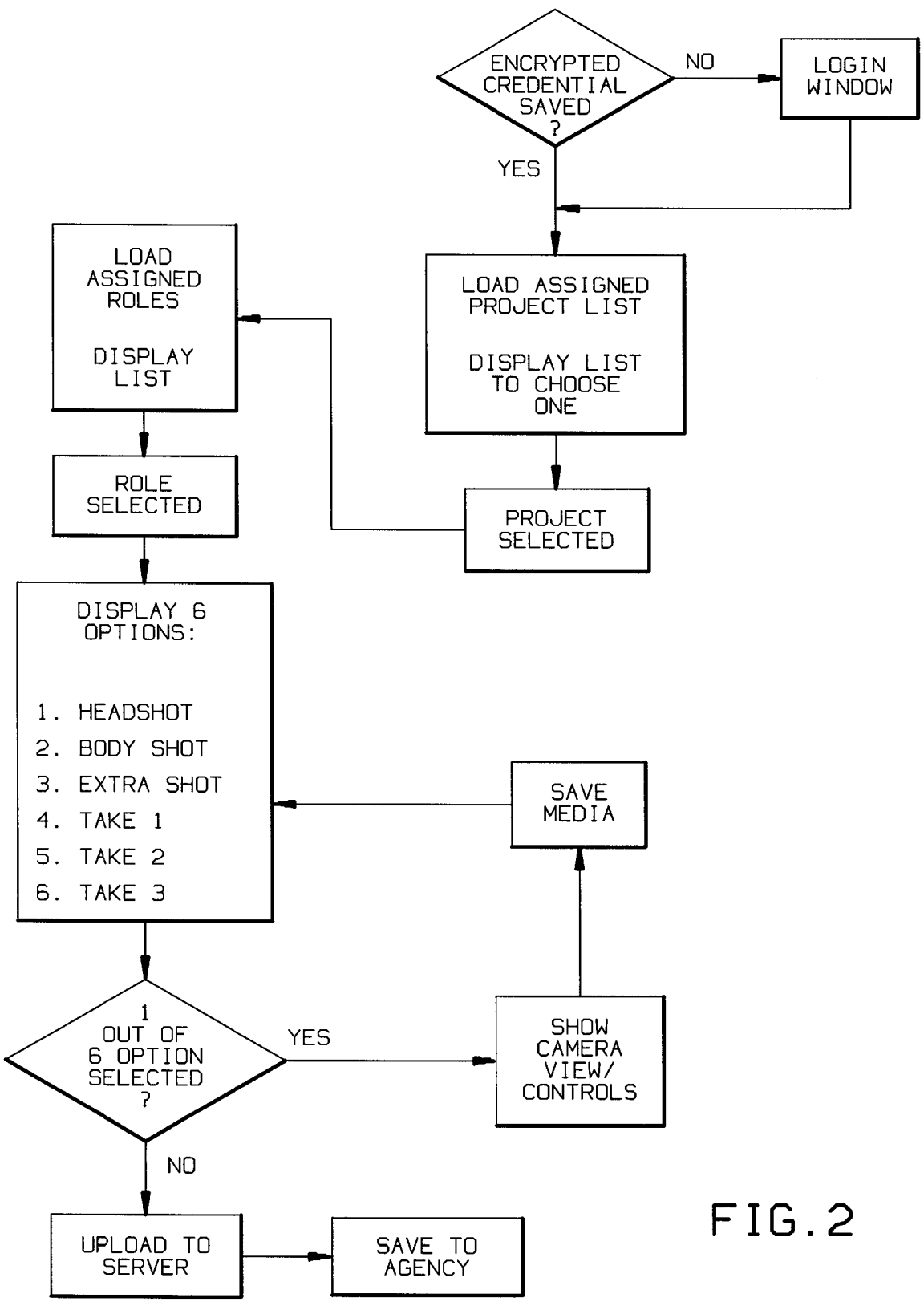
FIG. 2 is a flow chart describing an auditioning process for mobile applications, according to an exemplary embodiment of the present invention.

Referring to FIG. 2, there is shown a flowchart describing steps in an application, typically an application for a mobile device, which may be used by talent in creating and submitting their audition. The talent may load assigned roles (as assigned from the agent or agency, or as sent directly from the casting director, as described above) and display the list. Once a role is selected, the talent may have, for example, six options for entering data for their audition. The options may include a headshot, a body shot, an extra shot and up to three "takes". The takes may be video, audio and/or multimedia files for submission with the talent's audition. The talent may have the opportunity to review the photos and videos taken before they are uploaded to the server and available to the agency. While FIG. 2 shows six options for inclusion in the audition, other quantities of files may be included. For example, if additional photos are required, the application may provide means for the talent to submit the additional information.

Referring to FIGS. 3 and 4, there is shown a flowchart describing steps in an application, typically an application on a PC or Mac-based computer, which may be used by casting directors, agencies and talent alike. When the application is started, a log-in screen may appear. The log-in credentials of the user will determine access to certain components or data of the system. For example, casting director credentials may allow viewing requests from clients and sending/receiving requests/auditions to/from agents. Agent credentials may allow sending/receiving requests/auditions to/from talent as well as sending auditions to the casting director. Talent credentials may allow for receiving/sending requests/auditions from agents. Of course, alternate credentials may be set up. For example, if a casting director opts to directly contact talent, the system may temporarily allow the talent to directly send a reply audition to the casting director. As another example, if a client decides to work directly with an agency, the credentials of the agency may be set to allow direct communication with that particular client.

The application may ask the signed-in user confirm a working folder on their computer. The working folder may be the location where video, image and folder management data is stored. The user may then select a project. For talent, the application may function similar to the mobile application described above, where the talent may select a role and develop their audition with a requested number of photos, videos and the like. For agents, the application may include functionality for selecting talent for certain roles and sending the requests for auditions for these roles to the selected talent. Agents may also have the ability to edit auditions received from talent before sending the auditions to the casting director. For the casting director, the application may include functionality for setting up a breakdown for a project from a client. The casting director may also have the ability to send chosen auditions for roles to the client.

The auditions may be stored on a single server, thereby permitting instant access between the talent, agents, casting directors and clients. Each talent may have their own file space so that the talent may be able to store, for example, multiple headshots and choose a specific headshot for a specific role. This file space may be located locally on the talent's computer or may be located on the server holding the auditions. Each talent may also have a talent profile on the server. The talent profile may be maintained by the talent and may include additional photos, videos, the talent's resume and other pertinent information. The talent profile may be accessed by the agents, the casting directors and/or the clients should they wish to view additional information about the talent.

The system of the present invention may provide clients with auditions selected by the casting director. These auditions may be sent to the clients either through the applications of the present invention. In an alternate embodiment, the casting directors may send the final auditions for roles to the client via a secure web-based link.

The application software of the present invention may be broken down into various modules, including an audition recorder (allowing talent to record an audition for a role through computer or mobile), a remote audition recorder (optional live video conference for agency or casting director to see remote screen of "audition recorder program"), an audition filter (allowing agents to edit and/or remove auditions for particular roles), and an audition viewer (allowing clients and/or casting directors to view and review auditions from anywhere). The audition viewer may allow clients and/or casting directors to choose a first choice talent, a second choice talent, and the like. The audition viewer may be part of the overall application or may be designed as a stand-alone, web-based application.

The application software may provide search, user administration, project management, and audition management functions, as described in detail above. The application software may provide the ability for casting directors, agents and talent to communicate and schedule projects and auditions accordingly.

The application software may provide various means for communicating between the users of the system (talent, agents, casting directors, clients, and the like). For example, email, instant message, text message or the like may be used to notify the agent that a particular talent has auditioned for a particular role.

It should be understood, of course, that the foregoing relates to exemplary embodiments of the invention and that modifications may be made without departing from the spirit and scope of the invention as set forth in the following claims.

We claim:

1. A computer assisted auditioning system for enabling a plurality of casting directors to audition roles to talent, the auditioning system comprising:
   a log in credential verifying access point operably connected to a computer network to:
   receive a plurality of talent requirements communicated by a director;
   transmit the plurality of talent requirements to a third party talent agent;
   receive talent submissions from the third party talent agent in response to the plurality of talent requirements communicated by the director;
   transmit the submissions to the director; and
   store the plurality of talent requirements and submissions in a computer readable storage medium, wherein said log in credential verifying access point further comprises:
a director module that enables a casting director to create an editable breakdown of an audition,
wherein the breakdown comprises of a plurality of role requirements;
a talent agent module to edit said talent submissions received by the third party talent agent from talent in response to the plurality of talent requirements communicated by the director prior to submitting said submissions to the director,
wherein the talent agent module is operable to allocate audition breakdown or roles to specific talent; and
a talent module to allow individual talent to access the system and view available auditions;
wherein said talent module allows individual talent to create and upload said talent submissions to the system in response to the plurality of talent requirements communicated by the director.

2. The computer assisted auditioning system of claim 1, wherein the log in credential verifying access point to a system operably connected to a computer network is configured to operate on a mobile device.

3. A computer assisted auditioning system for enabling a plurality of casting directors to audition roles to talent, the auditioning system comprising:
a log in credential verifying access point operably connected to a computer network to:
receive a plurality of talent requirements communicated by a director;
transmit the plurality of talent requirements to a third party talent agent;
receive submissions from the third party talent agent in response to the plurality of talent requirements communicated by the director;
receive talent submissions directly from talent in response to the plurality of talent requirements communicated by the director;
transmit the talent submissions to the director; and
store the plurality of talent requirements and talent submissions in a computer readable storage medium;
wherein said log in credential verifying access point further comprises:
a director module that enables a casting director to create an editable breakdown of an audition,
wherein the breakdown comprises a plurality of role requirements;
a talent agent module that allows a talent agent to edit talent submissions received by a third party talent agent directly from the talent in response to the plurality of talent requirements communicated by the director prior to submitting said submissions to the director,
wherein the talent agent module is operable to allocate audition breakdown or roles to specific talent; and
a talent module to allow individual talent to access the system and view available auditions, and to create and directly upload said talent submissions for review or editing by the talent agent or by the director via said talent agent module or said director module, respectively.

4. The computer assisted auditioning system of claim 3, wherein the log in credential verifying access point to a system operably connected to a computer network is configured to operate on a mobile device.

5. A method for auditioning talent using a computer assisted auditioning system for enabling a plurality of casting directors to audition roles to talent, the method comprising:
providing a log in credential verifying access point to a system operably connected to at least a director and a talent agent;
receiving a plurality of talent requirements communicated by the director;
transmitting the plurality of talent requirements to a third party talent agent;
receiving submissions from the third party talent agent in response to the plurality of talent requirements communicated by the director;
transmitting the submissions to the director; and
storing the plurality of talent requirements and submissions in a computer readable storage medium,
wherein the method further comprises using said log in credential verifying access point which further comprises:
a director module that enables a casting director to create an editable breakdown of an audition,
wherein the breakdown comprises a plurality of role requirements;
a talent agent module that allows a talent agent to edit talent submissions received by the third party talent agent from talent in response to the plurality of talent requirements communicated by the director prior to submitting said talent submissions to the director,
wherein the talent agent module is operable to allocate audition breakdown or roles to specific talent; and
a talent module to allow individual talent to access the system and view available auditions, and to create and directly upload said talent submissions to the system in response to the plurality of talent requirements communicated by the director.

6. The method of claim 5, wherein the log in credential verifying access point to a system operably connected to a computer network is configured to operate on a mobile device.

* * * * *